(12) United States Patent
Kumar (10) Patent No.: US 10,606,419 B2
(45) Date of Patent: Mar. 31, 2020

(54) TOUCH SCREEN CONTROL (71) Applicant: Intel Corporation, Santa Clara, CA (US)

(72) Inventor: Shwetank Kumar, San Francisco, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/667,359

(22) Filed: Mar. 24, 2015

(65) Prior Publication Data

US 2016/0283034 A1 Sep. 29, 2016

(51) Int. Cl.
G06F 3/044 (2006.01)
G06F 3/041 (2006.01)

(52) U.S. Cl.
CPC ............ *G06F 3/044* (2013.01); *G06F 3/0416* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,928,256 A * | 5/1990 | Parnell | ................ | G06F 3/046 178/20.02 |
| 2011/0157068 A1* | 6/2011 | Parker | ................ | G06F 1/3203 345/174 |
| 2012/0013565 A1* | 1/2012 | Westhues | ................ | G06F 3/0418 345/174 |
| 2012/0054379 A1* | 3/2012 | Leung | ................ | G06F 1/3206 710/23 |
| 2013/0215049 A1* | 8/2013 | Lee | ................ | G06F 3/0416 345/173 |
| 2014/0085249 A1* | 3/2014 | Vandermeijden | ..... | G06F 3/0418 345/174 |
| 2014/0160085 A1* | 6/2014 | Rabii | ................ | G06F 1/3262 345/178 |
| 2015/0109217 A1* | 4/2015 | Zhu | ................ | G06F 1/3262 345/173 |
| 2015/0309610 A1* | 10/2015 | Rabii | ................ | G06F 3/044 345/174 |
| 2016/0216836 A1* | 7/2016 | Yao | ................ | G06F 3/0418 |

* cited by examiner

*Primary Examiner* — Priyank J Shah
(74) *Attorney, Agent, or Firm* — Womble Bond Dickinson (US) LLP (57) ABSTRACT

An apparatus and method for display control are described. In one embodiment, the apparatus comprises: a touch screen surface comprising a plurality of transmitters and a plurality of receivers; and a processing system coupled to the touch screen surface to excite all transmitters in the plurality of transmitters or a subset of transmitters in the plurality of transmitters during different scanning periods when scanning the plurality of transmitters to obtain input signals from the touch screen surface, the subset of transmitters being less than all transmitters in the plurality of transmitters.

21 Claims, 6 Drawing Sheets

TOUCH SCREEN CONTROL

FIELD OF THE INVENTION

Embodiments of the present invention relate to the field of touch screen-based systems; more particularly, embodiments of the present invention relate to touch screen-based systems that adaptively control the number of transmitters that are activated and scanned when detecting input signals with the touch screen.

BACKGROUND OF THE INVENTION

Touch screens are electronic display input devices used by various systems to receive input from a user by touching the screen with a finger and stylus. The systems that use touch screens include computer systems, tablets, and mobile phones. Touch screens have also been referred to as touchpads or touch sensor devices.

Capacitive touch surfaces are one type of touch screen technology. Capacitive touch surfaces determine the position of an object, such as a finger or stylus, by detecting a change in capacitance due to a distortion in an electrostatic field that occurs when the touch screen is touched. Often capacitive touch surfaces have a set of transmitters and a set of receivers to determine the position of the location of where the touch screen was touched. The controller for the touch surface excites all the transmitters one after another to detect signals corresponding to objects in contact with the surface.

A passive pen is a convenient and cost efficient stylus used with touch screens. However, the signals generated from use of the passive pen on the touch screen are usually low magnitude and easily disturbed by noise. As a result, passive pen strokes that are produced by the touch screen are often discontinuous or jittery, which causes an unpleasant user experience.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

In one embodiment, an electronic system comprises a touch screen (touch sensor) surface having multiple transmitters and multiple receivers and a processing system coupled to the touch screen surface to control the transmitters and receivers. For example, in one embodiment, the processing system drives, or excites, all transmitters in the plurality of transmitters or a subset of transmitters in during different scanning periods to obtain input signals from the touch screen surface. In one embodiment, the processing system includes a transmitter selection module to select module selects transmitters based on a prediction of which transmitter-receiver pairs are likely to produce input signals. In one embodiment, the input signals are due to a stylus (e.g., a passive pen) being moved in proximity to the touch screen surface, and the transmitter selection module selects transmitters based on a prediction of a range of motion of the stylus (e.g., the next possible position of the stylus). In one embodiment, the transmitter selection module selects transmitters based on a trace prediction associated with motion of a stylus.

Techniques described herein with respect to the selection of transmitters are used in one embodiment to increase the signal-to-noise (SNR) ratio of stylus (e.g., passive pen) signal and obtain cleaner and more stable stylus signal. For example, once a stylus signal, such as, for example, a passive pen signal, is detected by the touch screen surface, a controller in the processing system only excites the transmitters around the stylus contact point during a scanning operation. In one embodiment, by scanning less transmitters, the controller is able to scan those transmitters reporting stylus signals at a higher rate in a given time period. Therefore, the SNR of the stylus signal can be improved.

In another embodiment, the controller in the processing system makes a trade-off between the stylus SNR and latency. As discussed above, a typical touch screen surface excites all the transmitters one after another to detect signals for objects in contact with the screen. There is a trade-off between the number of transmitters and dwell (averaging) time on each transmitter. In one embodiment, because only the transmitters close to the location of the stylus are scanned, fewer transmitters than are typically needed to generate the image of the entire touch surface being touched by the stylus. This allows for the selection of either spending the same time on each of the transmitters being scanned, thereby reducing the latency significantly because there are fewer transmitters being scanned, or average more time on each transmitter being scanned, thereby increasing SNR for the same latency.

Figure 1:
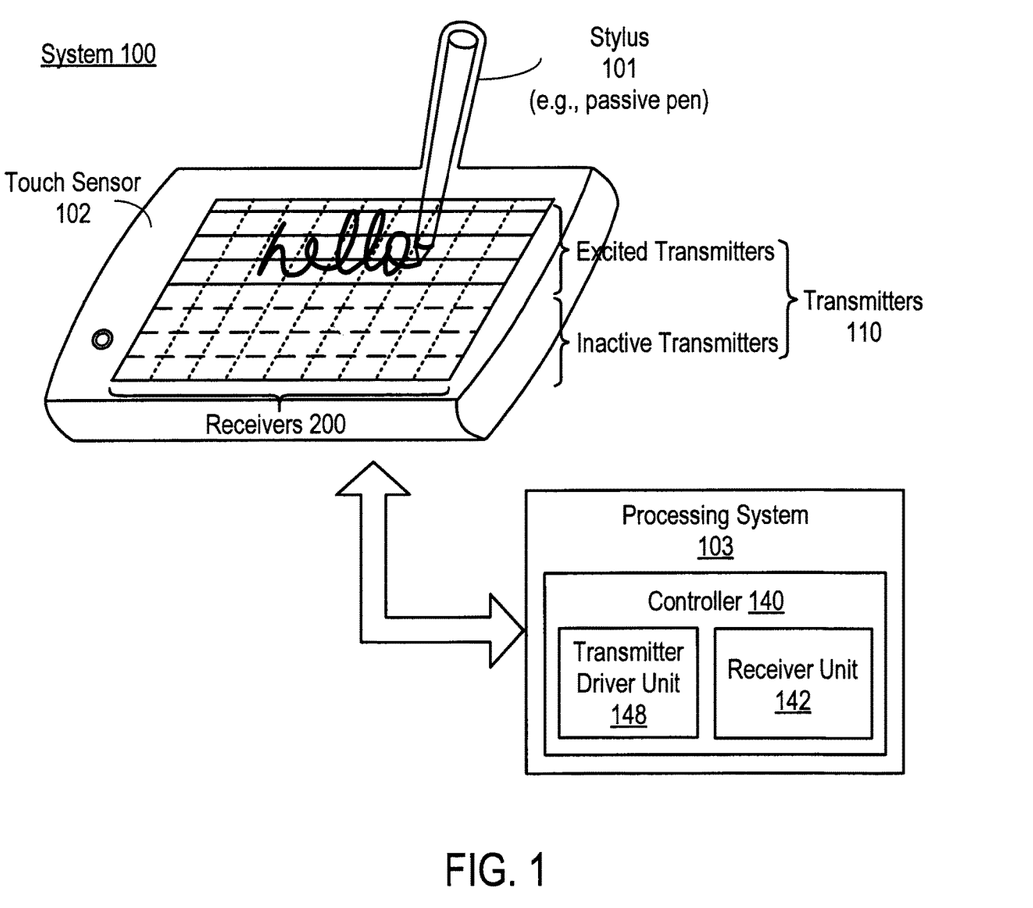
FIG. 1 is a block diagram of one embodiment of a system that includes a touch screen surface.

FIG. 1 is a block diagram of one embodiment of a system that includes a touch screen surface. The system processes input signals received through the use of the touch screen surface. The system may comprises a computer system (e.g., laptop computer, notebook computer, desktop, computer), a tablet, a personal digital assistant (PDA), mobile or smart phone, a kiosk, video game machine, media player, etc.

Referring to FIG. 1, system 100 includes touch screen 102 ("touchpad" or a "touch sensor device") and processing system 103. Stylus 101 (e.g., a passive pen) is used by a user to input information (e.g., strokes, menu or other graphical user interface (GUI) selections, etc.). While system 100 is shown with stylus 101, other types of objects may be used in conjunction with touch screen 102, such as, for example, a finger.

Touch screen 102 includes a sensing region to detect user input from stylus 101 (or another input object). The sizes, shapes, and locations of a sensing area may vary and is limited based on the signal-to-noise ratios (SNRs) that may prevent sufficiently accurate object detection.

In one embodiment, touch screen 102 utilizes a group of transmitters 110 and receivers 120 to form the sensing area to detect user input. Transmitter 110 and receiver 120 act as capacitive sensing elements for detecting the user input. The techniques described herein are not limited to capacitive sensing and can be used with other types of technologies. That is, using transmitters 110 and receivers 120, touch screen 102 employs a mutual capacitance, or transcapacitance, sensing method that is based on detectable and measured changes in capacitive coupling between one or more of transmitters 110 and one or more of receivers 120. Processing system 103 includes a controller 140 that controls transmitters 110 and receivers 120 to detect movement of stylus 101 or other user input through touch screen 102. Controller 140 includes transmitter drive unit 141 and receive unit 142 that are part of an analog front end. Transmitter drive unit 141 comprises transmitter circuitry to transmit signals with transmitters 110, while receive unit 142 comprises receiver circuitry to receive signals with receivers 120. More specifically, transmitters 110 are driven (modulated) by a voltage from transmitter drive unit 141 of controller 140 to transmit signals. Under control of receive unit 142 of controller 140, receivers 120 receive the signals generated by transmitters 110. The capacitive coupling between transmitters 110 and receivers 120 changes with the proximity and motion of stylus 101.

In one embodiment, transmitters 110 and receivers 120 are arranged substantially perpendicular to each other. It will be appreciated, however, that the invention is not limited to this arrangement, and transmitters 110 and receivers 120 may be arranged in other patterns. In one embodiment, transmitters 110 and receivers 120 are dedicated to only being a transmitter or a receiver. In another embodiment, each of transmitters 110 and receivers 120 is configured to transmit and receive.

Processing system 103 performs various processing operations, including those associated with obtaining and handling signals from touch screen 102. In one embodiment, processing system 103 is integrated into the same device as touch screen 102. In another embodiment, processing system 103 is a device that is physically separate from touch screen 102. Communication between touch screen 102 and processing system 103 is by wired or wireless connection.

In one embodiment, processing system 103 comprises one or more integrated circuits (ICs) and/or other circuitry components. For example, processing system 103 may comprise a touch IC (e.g., touch IC firmware), a system-on-a-chip (SOC), etc. In one embodiment, processing system 103 comprises a set of modules, and each module comprises hardware (e.g., circuitry) software, firmware, or a combination of the three. In one embodiment, processing system 103 comprises instructions (e.g., software code, firmware code, etc.). In one embodiment, processing system 103 comprises software configured to run on a central processing unit (CPU) of a computer system and one or more ICs separate from the CPU. In another embodiment, processing system 103 comprises circuits and firmware that are part of a portable phone.

In one embodiment, processing system 103 includes processing modules or units to perform one or more operations in response to movement of stylus 101 or other user input with respect to touch screen 102. These operations process the user input received from touch screen 102. In one embodiment, the user input obtained from touch screen 102 is in the form of electrical signals indicative of input created due to stylus 101 or other user input with respect to touch screen 102. In one embodiment, processing system 103 performs one or more of the following operations: digitizing analog electrical signals obtained from the receivers of touch screen 102, filtering analog or digital signals, determining stroke information or performing handwriting recognition, receiving and/or recognizing inputs for GUI elements (e.g., menu selections, cursor movements, button selections, etc.). In one embodiment, the processed information is sent to another part of processing system 103, such as, for example, a central processing unit (CPU), which acts on the user input.

In one embodiment, processing system 103 may subtract a baseline image from raw image data produced by an analog front end in processing system 103 to create a difference image, referred to herein as a delta image. In one embodiment, the system comprises a touch screen surface having a plurality of transmitters and a plurality of receivers and a processing system coupled to the touch screen surface to drive all transmitters in the plurality of transmitters or a subset of transmitters in the plurality of transmitters during different scanning periods when scanning the plurality of transmitters to obtain input signals from the touch screen surface, where the processing system includes a transmitter selection module, an analog front end, and a baseline removal module. The transmitter selection module selects transmitters for scanning, such as those that are part of the subset of transmitters. The analog front end is responsive to selection of transmitters by the transmitter selection module to drive transmitters in the subset of transmitters. The baseline removal module is responsive to the selection of transmitters by the transmitter selection module and generates a delta image based on raw image data received from the analog front end and the transmitter selection from the transmitter selection module.

For purposes herein, a baseline image is used to determine whether the touch screen has received user input. In one embodiment, the baseline image is created when no input is being made upon the touch screen and includes determining the capacitance associated with the touch screen surface when there is no input being made. Thereafter, to determine when an input has been made, the baseline image is subtracted from the image currently being made from the sensors of the touch screen surface and difference may be used to represent user input.

Figure 2:
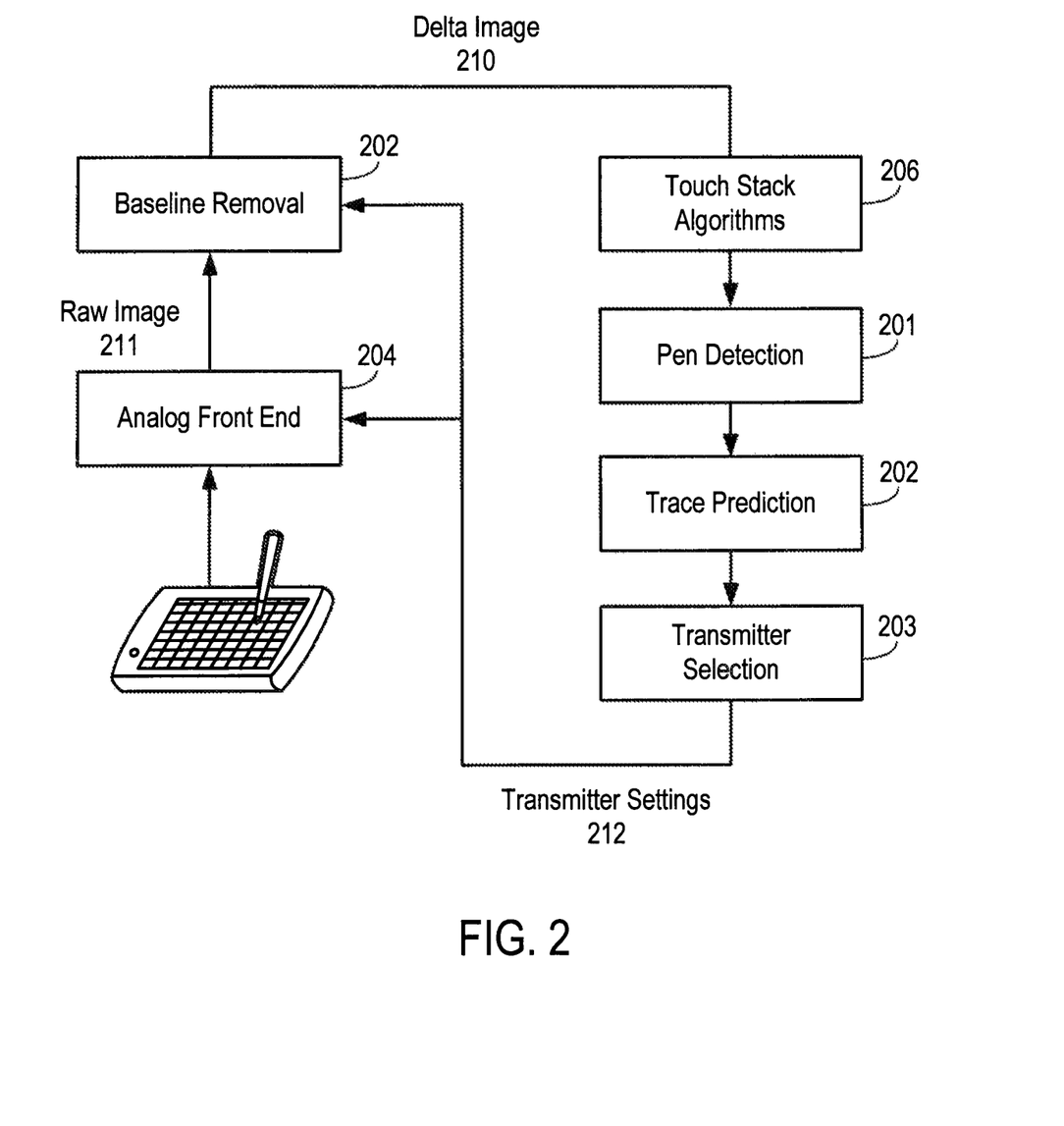
FIG. 2 is data flow diagram of one embodiment of a process for adaptive scanning using the processing system.

FIG. 2 is data flow diagram of one embodiment of a process for adaptive scanning using the processing system. The process is performed by processing logic in modules that may comprise hardware (circuitry, dedicated logic, etc.), software (such as is run on a general purpose computer system or a dedicated machine), firmware or a combination of these three.

Referring to FIG. 2, a pen detection module detects an input signal (processing block 201). In response to the pen (or other stylus or input) being detected, a trace detection module determines the possible range of pen motion (processing block 202). In one embodiment, the trace detection module uses tracking algorithms such as, for example, a Kalman filter, to predict the next possible position of the pen. A transmitter selection module selects a small number of transmitters (a subset of transmitters less than all of the transmitters of the touch screen) that cover the predicted range of the motion and sends feedback (transmitter settings 212) to the analog front end (processing block 203). In one embodiment, this is done on the fly (as the pen is being moved). The number of transmitters that are active is based on the size of the touch screen surface. For example, only 30, 40, 60, 80, etc. transmitters may be active. The number of active transmitters may be based on whether the touch screen surface is in landscape or portrait mode. In landscape mode, the transmitters are running horizontally and the receivers are running vertically (suppose). When a person is writing normally on the touch screen surface, they will be writing along the same direction as the transmitters. Since the transmitters are scanned one at a time, the same transmitters are repeatedly scanned until the user has written to the end of the display and needs to change to the next line. This line will have a different set of transmitters associated with it, they will be scanned next. Thus, only a subset of transmitters (e.g., 4 or 5 transmitters) need to be active per line and once the user has reached the end of the touch screen, it is known that they are going to jump to a new location on the touch screen. At that point, the processing system goes back to scanning all transmitters until the pen lands on the tough screen surface again.

In portrait mode, the transmitters are running vertically, and the receivers are running horizontally (suppose). In this case, when a person is writing normally, they will be writing along the receivers. Since the transmitters are scanned one at a time, as person moves along the display surface when writing they will move from one transmitter to the next. Therefore, the transmitters that need to be scanned will change continuously as they write along the display surface.

The analog front end excites only the selected transmitters (processing block 204). In one embodiment, the transmitter selection module stores transmitter settings 212 in a configuration register. When the analog front-end is going to scan the touch screen surface, it accesses the configuration register to determine which transmitters to scan. For example, the transmitter selection may indicate that certain transmitters are to be scanned in a particular order (e.g., scan 12, 3, 5, 7, 9, etc. in that order). The analog front end will keep scanning according to the instructions until the values in the register are changed. In response to input signals received by the receive unit in the analog first and from the receiver in the touch screen surface, the analog front end generates a first sensor image, raw image 211, based on the signals that result from the scanning operation.

The transistor selection module also sends transmitter settings 212 to the base line removal module. The baseline removal module uses transmitter settings 212 in order to select a proper baseline image to calculate delta image 210. The term "baseline" as used herein refers, in general, to the image (or set of baseline values) that is produced when no input is made to the touch screen surface. The baseline removal module receives raw image 211 from the analog front end corresponding to only those transmitters that were selected and subtracts only that portion of image data from the baseline image to create delta image 210.

Figure 5:
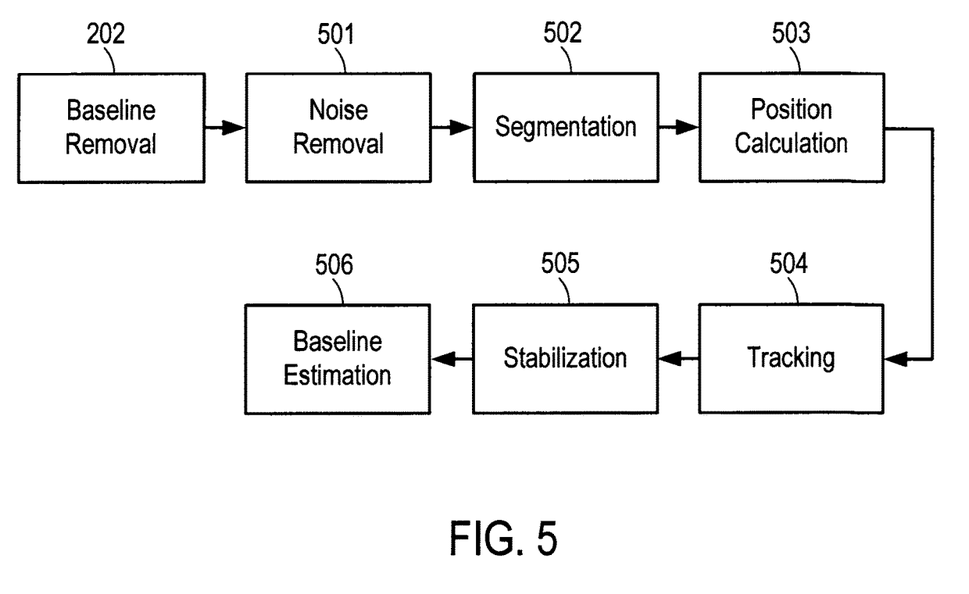
FIG. 5 is a flow diagram of one embodiment of a touch pipeline.

After creating delta image 210, a touch stack module 206 performs a touch stack algorithm to enable using delta image 210 to process the next set of input data (e.g., the next motion of the pen. FIG. 5 illustrates one embodiment of a flow diagram of a touch stack process performed by touch stack module 206. The process is performed by processing logic in modules that may comprise hardware (circuitry, dedicated logic, etc.), software (such as is run on a general purpose computer system or a dedicated machine), firmware or a combination of these three. Referring to FIG. 5, the process begins by noise removal module 501 receiving a delta image from baseline removal module 202 and performing a noise removal operation on the delta image. There are numerous well-known noise removal, or denoising, algorithms that may be used. After noise removal, segmentation module 502 segments that denoised delta image and position calculation module 503 uses the segmented delta image to calculate position information with respect to the position of input objects that appear in the delta image. The position information is used by tracking module 504 to perform tracking on the input objects as they cross the touch screen surface. Stabilization module 505 performs image stabilization to reduce blurring associated with the motion of the input objects that appear on the touch screen surface. Lastly, baseline estimation module 506 receives the output of stabilization module 505 and provides a baseline estimate that used by pen detection module 201 to determine if the input objects being made to the touch screen surface are those associated with a pen (stylus) or other input creator (e.g., finger).

Note that in one embodiment once the pen is lifted and the transmitter settings will go back to scanning all the transmitters and the process is able to repeat itself.

Also in one embodiment, all the transmitters are scanned on a regular interval (e.g., 20 ms, 30 ms, etc.) to ensure data is not being missed.

Figure 3:
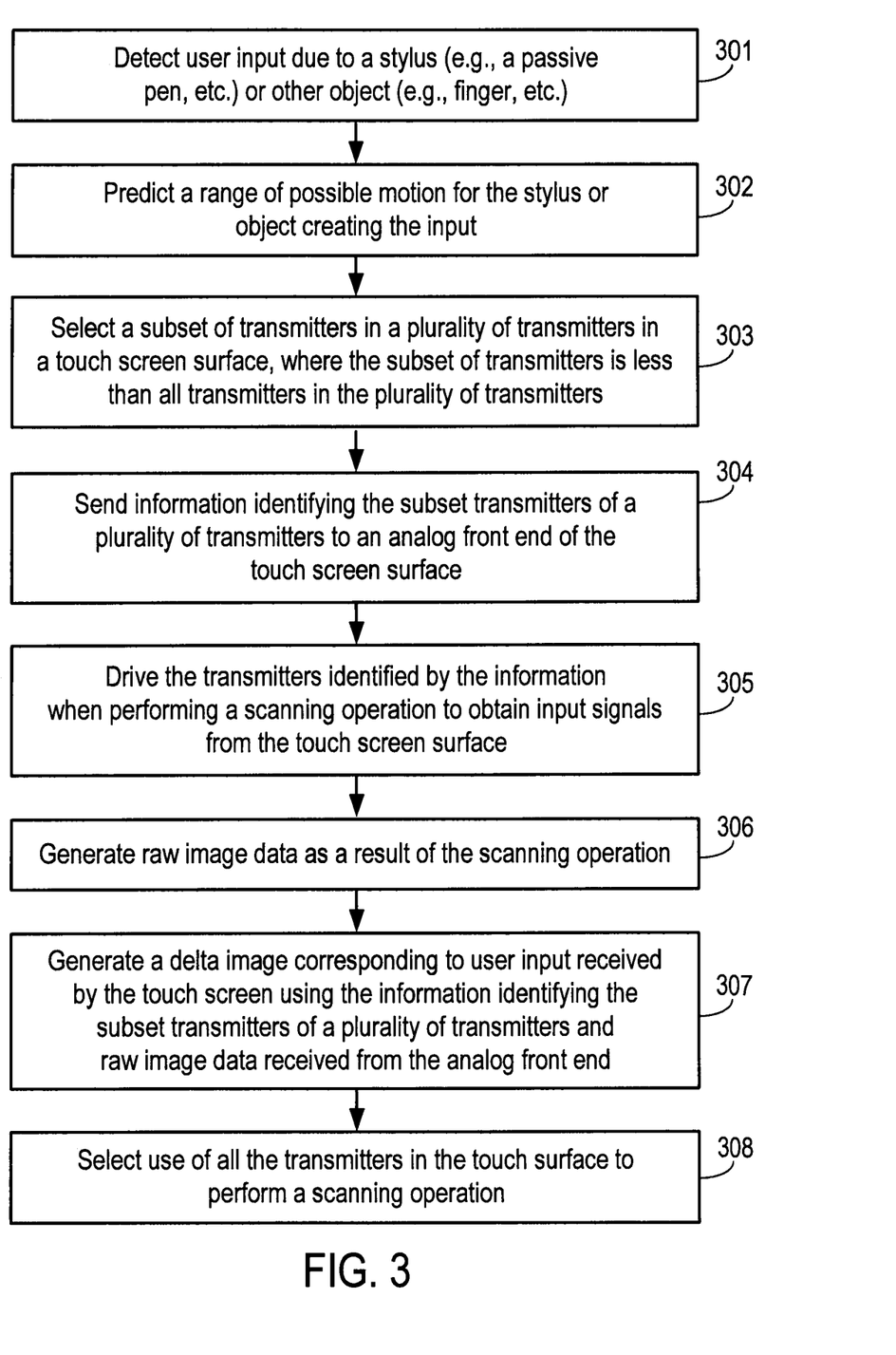
FIG. 3 is data flow diagram of another embodiment of a process for adaptive scanning for a touch screen surface having multiple transmitters and receivers.

FIG. 3 is data flow diagram of another embodiment of a process for adaptive scanning for a touch screen surface having multiple transmitters and receivers. The process is performed by processing logic in modules that may comprise hardware (circuitry, dedicated logic, etc.), software (such as is run on a general purpose computer system or a dedicated machine), firmware or a combination of these three.

Referring to FIG. 3, the process begins by processing logic detecting user input due to a stylus (e.g., a passive pen, etc.) or other object (e.g., finger, etc.) (processing block 301). In one embodiment, this occurs as a result of performing a scanning operation in which all the transmitters in the touch screen display are excited.

Based on the user input, processing logic predicts a range of possible motion for the stylus or object creating the input (processing block 302). In embodiment, this may be due to use of a prediction algorithm (e.g., a trace prediction algorithm).

Next, processing logic selects a subset of transmitters in a plurality of transmitters in a touch screen surface, where the subset of transmitters is less than all transmitters in the plurality of transmitters (processing block 303). In one embodiment, selecting a subset of transmitters in a plurality of transmitters is based on a prediction of which transmitter-receiver pairs are likely to produce input signals. In another embodiment, the input signals are due to a stylus (e.g., a passive pen, finger, etc.) being moved in proximity to the touch screen surface, and selecting a subset of transmitters in a plurality of transmitters is based on a prediction of a range of motion of the stylus. In yet another embodiment, selecting a subset of transmitters in a plurality of transmitters is based on a trace prediction associated with motion of a stylus.

Figure 4:
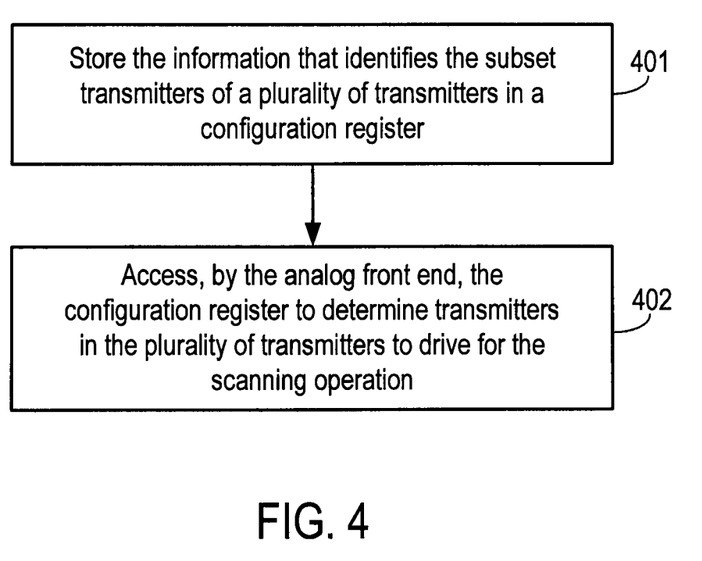
FIG. 4 is a data flow diagram of one embodiment of a process for sending information identifying the subset transmitters of a plurality of transmitters to an analog front end of the touch screen surface.

After selecting the subset of transmitters, processing logic sends information identifying the subset transmitters of a plurality of transmitters to an analog front end of the touch screen surface (processing block 304). In one embodiment, sending the information occurs on the fly. FIG. 4 is a flow diagram of one embodiment of a process for sending information identifying the subset transmitters of a plurality of transmitters to an analog front end of the touch screen surface. The process is performed by processing logic in modules that may comprise hardware (circuitry, dedicated logic, etc.), software (such as is run on a general purpose computer system or a dedicated machine), firmware or a combination of these three. Referring to FIG. 4, the process begins by processing logic storing the information that identifies the subset transmitters of a plurality of transmitters in a configuration register (processing block 401) and accessing, by the analog front end, the configuration register to determine transmitters in the plurality of transmitters to drive for the scanning operation (processing block 402).

Referring back to FIG. 3, driving the transmitters identified by the information when performing a scanning operation to obtain input signals from the touch screen surface (processing block 305). In one embodiment, the dwell time for each of the transmitters when the plurality of transmitters are being scanned is equal to the dwell time for each transmitter in the subset of transmitters when only the subset of transmitters are driven for the scanning operation. In another embodiment, the dwell time for each of the transmitters when the plurality of transmitters being scanned is less than dwell time for each transmitter in the subset of transmitters when only the subset of transmitters are driven for the scanning operation.

Processing logic generates raw image data as a result of the scanning operation (processing block 306). This is performed in a manner well-known in the art.

Using the raw image data, processing logic generates a delta image corresponding to user input received by the touch screen using the information identifying the subset transmitters of a plurality of transmitters and raw image data received from the analog front end (processing block 307).

Subsequently, processing logic selects use of all the transmitters in the touch surface to perform a scanning operation (processing block 308). This may occur in response to the stylus (e.g., pen) being lifted such as when a user reaches the end of the touch screen surface. Thereafter, the process is able to repeat.

Figure 6:
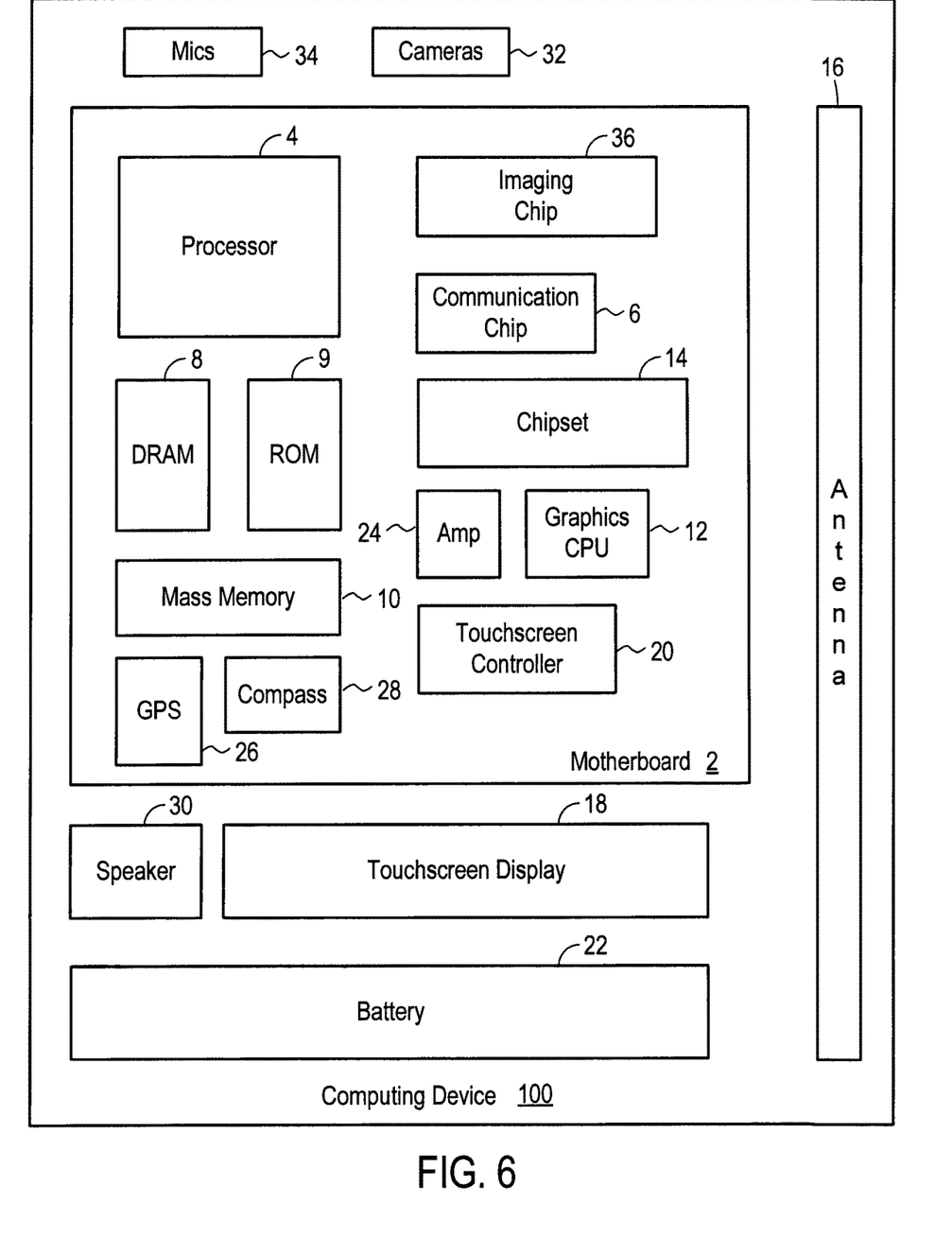
FIG. 6 is a block diagram of one embodiment of additional components in the processing system.

FIG. 6 illustrates a portable image capture device 100 in accordance with one implementation. The imaging device 100 houses a system board 2. The board 2 may include a number of components, including but not limited to a processor 4 and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20 which performs the technique described above, a battery 22, an audio codec (not shown), a video codec (not shown), a power amplifier 24, a global positioning system (GPS) device 26, a compass 28, an accelerometer (not shown), a gyroscope (not shown), a speaker 30, one or more cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36, such as an imaging signal processor and to the processor 4, either directly or through the image chip. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may include all of the components of the camera or share resources, such as memory 8, 9, 10, processing 4 and user interface 12, 20, with other video device components and functions. The processor 4 is coupled to the camera and to memory to receive frames and produce enhanced images and machine vision as described. The cameras may also include an image processing system, as described above, to share tasks with the processor 4 to generate enhanced or de-noised images.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

In a first example embodiment, an apparatus comprises a touch screen surface comprising a plurality of transmitters and a plurality of receivers and a processing system coupled to the touch screen surface to excite all transmitters in the plurality of transmitters or a subset of transmitters in the plurality of transmitters during different scanning periods when scanning the plurality of transmitters to obtain input signals from the touch screen surface, the subset of transmitters being less than all transmitters in the plurality of transmitters.

In another example embodiment, the subject matter of the first example embodiment can optionally include that the processing system comprises a transmitter selection module to select transmitters in the subset of transmitters for scanning and an analog front end responsive to selection of transmitters by the transmitter selection module to drive transmitters in the subset of transmitters.

In another example embodiment, the subject matter of the first example embodiment can optionally include that the transmitter selection module selects transmitters based on a prediction of which transmitter-receiver pairs are likely to produce input signals.

In another example embodiment, the subject matter of the first example embodiment can optionally include that the input signals are due to a stylus being moved in proximity to the touch screen surface, and that the transmitter selection module selects transmitters based on a prediction of a range of motion of the stylus. In another example embodiment, the subject matter of this example embodiment can optionally include that the stylus is a passive pen.

In another example embodiment, the subject matter of the first example embodiment can optionally include that the transmitter selection module selects transmitters based on a trace prediction associated with motion of a stylus.

In another example embodiment, the subject matter of the first example embodiment can optionally include that the processing system comprises a transmitter selection module to select transmitters for scanning, including which transmitters are part of the subset of transmitters, an analog front end responsive to selection of transmitters by the transmitter selection module to drive transmitters in the subset of transmitters, and a baseline removal module responsive to the selection of transmitters by the transmitter selection module. In another example embodiment, the subject matter of this example embodiment can optionally include that the baseline removal module is operable to generate a delta image based on raw image data received from the analog front end and the transmitter selection from the transmitter selection module.

In another example embodiment, the subject matter of the first example embodiment can optionally include that the dwell time for each of the transmitters when the plurality of transmitters are being scanned is equal to dwell time for each transmitter in the subset of transmitters when only the subset of transmitters are driven for a scanning operation.

In another example embodiment, the subject matter of the first example embodiment can optionally include that the dwell time for each of the transmitters when the plurality of transmitters are scanned is less than dwell time for each transmitter in the subset of transmitters when only the subset of transmitters are driven for a scanning operation.

In a second example embodiment, a method comprises selecting a subset of transmitters in a plurality of transmitters in a touch screen surface having a plurality of receivers for scanning, the subset of transmitters being less than all transmitters in the plurality of transmitters, sending information identifying the subset transmitters of a plurality of transmitters to an analog front end of the touch screen surface, and driving the transmitters identified by the information when performing a scanning operation to obtain input signals from the touch screen surface.

In another example embodiment, the subject matter of the second example embodiment can optionally include that sending the information occurs on the fly.

In another example embodiment, the subject matter of the second example embodiment can optionally include that selecting a subset of transmitters in a plurality of transmitters is based on a prediction of which transmitter-receiver pairs are likely to produce input signals.

In another example embodiment, the subject matter of the second example embodiment can optionally include that the input signals are due to a stylus being moved in proximity to the touch screen surface, and wherein selecting a subset of transmitters in a plurality of transmitters is based on a prediction of a range of motion of the stylus. In another example embodiment, the subject matter of this example embodiment can optionally include that the stylus is a passive pen.

In another example embodiment, the subject matter of the second example embodiment can optionally include that selecting a subset of transmitters in a plurality of transmitters is based on a trace prediction associated with motion of a stylus.

In another example embodiment, the subject matter of the second example embodiment can optionally include generating a delta image corresponding to user input received by the touch screen using the information identifying the subset transmitters of a plurality of transmitters and raw image data received from the analog front end.

In another example embodiment, the subject matter of the second example embodiment can optionally include storing the information in a configuration register and accessing the configuration register to determine transmitters in the plurality of transmitters to drive for the scanning operation.

In another example embodiment, the subject matter of the second example embodiment can optionally include that the dwell time for each of the transmitters when the plurality of transmitters are being scanned is equal to dwell time for each transmitter in the subset of transmitters when only the subset of transmitters are driven for the scanning operation.

In another example embodiment, the subject matter of the second example embodiment can optionally include that the dwell time for each of the transmitters when the plurality of transmitters are scanned is less than dwell time for each transmitter in the subset of transmitters when only the subset of transmitters are driven for the scanning operation.

In a third example embodiment, an article of manufacture has one or more non-transitory computer readable media storing instructions which, when executed by a system having a touch screen surface with a plurality of transmitters and a plurality of receivers, cause the system to perform a method comprising selecting a subset of transmitters in a plurality of transmitters in a touch screen surface having a plurality of receivers for scanning, the subset of transmitters being less than all transmitters in the plurality of transmitters and sending information identifying the subset transmitters of a plurality of transmitters to an analog front end of the touch screen surface to cause the analog front end to perform a scanning operation to obtain input signals from the touch screen surface by driving the transmitters identified by the information when performing a scanning operation to obtain input signals from the touch screen surface.

In another example embodiment, the subject matter of the third example embodiment can optionally include that selecting a subset of transmitters in a plurality of transmitters is based on a prediction of which transmitter-receiver pairs are likely to produce input signals.

In another example embodiment, the subject matter of the third example embodiment can optionally include that the input signals are due to a stylus being moved in proximity to the touch screen surface, and that selecting a subset of transmitters in a plurality of transmitters is based on a prediction of a range of motion of the stylus.

In another example embodiment, the subject matter of the third example embodiment can optionally include generating a delta image corresponding to user input received by the touch screen using the information identifying the subset transmitters of a plurality of transmitters and raw image data received from the analog front end.

In another example embodiment, the subject matter of the third example embodiment can optionally include storing the information in a configuration register and accessing the configuration register to determine transmitters in the plurality of transmitters to drive for the scanning operation.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. An apparatus comprising:
   a touch screen surface comprising a plurality of transmitters and a plurality of receivers; and
   a processing system coupled to the touch screen surface to excite all transmitters in the plurality of transmitters or a subset of transmitters in the plurality of transmitters during different scanning periods when scanning the plurality of transmitters to obtain input signals from the touch screen surface, the subset of transmitters being less than all transmitters in the plurality of transmitters, wherein the processing system comprises
      a transmitter selection module to select a subset of transmitters for scanning, wherein the transmitter selection module selects the subset of transmitters based on a trace prediction algorithm that continuously changes the transmitter selection by continuously tracing an input signal of a stylus being moved in proximity to the touch screen surface, wherein the transmitter selection module is to select all of the transmitters when the stylus moves out of proximity to the touch screen surface, and wherein a number of transmitters for the subset of transmitters selected for scanning corresponds to an orientation of the apparatus, and
      an analog front end responsive to selection of transmitters by the transmitter selection module to drive the selected transmitters in the subset of transmitters based on the prediction.

2. The apparatus defined in claim 1 wherein the input signals are due to the stylus being moved in proximity to the touch screen surface, and further wherein the transmitter selection module selects transmitters based on a prediction of a range of motion of the stylus.

3. The apparatus defined in claim 2 wherein the stylus is a passive pen.

4. The apparatus defined in claim 1 wherein the transmitter selection module selects transmitters based on a trace prediction associated with motion of a stylus.

5. The apparatus defined in claim 1 wherein the processing system comprises:

a transmitter selection module to select transmitters for scanning, including which transmitters are part of the subset of transmitters;

an analog front end responsive to selection of transmitters by the transmitter selection module to drive transmitters in the subset of transmitters; and a baseline removal module responsive to the selection of transmitters by the transmitter selection module.

6. The apparatus defined in claim 5 wherein the baseline removal module is operable to generate a delta image based on raw image data received from the analog front end and the transmitter selection from the transmitter selection module.

7. The apparatus defined in claim 1 wherein dwell time for each of the transmitters when the plurality of transmitters are being scanned is equal to dwell time for each transmitter in the subset of transmitters when only the subset of transmitters are driven for a scanning operation.

8. The apparatus defined in claim 1 wherein dwell time for each of the transmitters when the plurality of transmitters are scanned is less than dwell time for each transmitter in the subset of transmitters when only the subset of transmitters are driven for a scanning operation.

9. A method comprising:
selecting a subset of transmitters in a plurality of transmitters in a touch screen surface having a plurality of receivers for scanning, the subset of transmitters being less than all transmitters in the plurality of transmitters, wherein selecting a subset of transmitters in a plurality of transmitters is based on a trace prediction algorithm that continuously changes the transmitter selection by continuously tracing an input signal of a stylus being moved in proximity to the touch screen surface, wherein all of the transmitters are selected when the stylus moves out of proximity to the touch screen surface, and wherein a number of transmitters for the subset of transmitters selected for scanning corresponds to an orientation of the apparatus;

sending information identifying the selected subset transmitters based on the prediction of a plurality of transmitters to an analog front end of the touch screen surface; and driving the selected transmitters identified by the information when performing a scanning operation to obtain input signals from the touch screen surface.

10. The method defined in claim 9 wherein sending the information occurs on the fly.

11. The method defined in claim 9 wherein the input signals are due to a stylus being moved in proximity to the touch screen surface, and wherein selecting a subset of transmitters in a plurality of transmitters is based on a prediction of a range of motion of the stylus.

12. The method defined in claim 11 wherein the stylus is a passive pen.

13. The method defined in claim 9 wherein selecting a subset of transmitters in a plurality of transmitters is based on a trace prediction associated with motion of a stylus.

14. The method defined in claim 9 further comprising generating a delta image corresponding to user input received by the touch screen using the information identifying the subset transmitters of a plurality of transmitters and raw image data received from the analog front end.

15. The method defined in claim 9 further comprising:
storing the information in a configuration register; and
accessing the configuration register to determine transmitters in the plurality of transmitters to drive for the scanning operation.

16. The method defined in claim 9 wherein dwell time for each of the transmitters when the plurality of transmitters are being scanned is equal to dwell time for each transmitter in the subset of transmitters when only the subset of transmitters are driven for the scanning operation.

17. The method defined in claim 9 wherein dwell time for each of the transmitters when the plurality of transmitters are scanned is less than dwell time for each transmitter in the subset of transmitters when only the subset of transmitters are driven for the scanning operation.

18. An article of manufacture having one or more non-transitory computer readable media storing instructions which, when executed by a system having a touch screen surface with a plurality of transmitters and a plurality of receivers, cause the system to perform a method comprising:
selecting a subset of transmitters in a plurality of transmitters in a touch screen surface having a plurality of receivers for scanning, the subset of transmitters being less than all transmitters in the plurality of transmitters, wherein selecting a subset of transmitters in a plurality of transmitters is based on a trace prediction algorithm that continuously changes the transmitter selection by continuously tracing an input signal of a stylus being moved in proximity to the touch screen surface, wherein all of the transmitters are selected when the stylus moves out of proximity to the touch screen surface, and wherein a number of transmitters for the subset of transmitters selected for scanning corresponds to an orientation of the apparatus; and sending information identifying the selected subset transmitters of a plurality of transmitters based on the prediction to an analog front end of the touch screen surface to cause the analog front end to perform a scanning operation to obtain input signals from the touch screen surface by driving the selected transmitters identified by the information when performing a scanning operation to obtain input signals from the touch screen surface.

19. The article of manufacture defined in claim 18 wherein the input signals are due to a stylus being moved in proximity to the touch screen surface, and wherein selecting a subset of transmitters in a plurality of transmitters is based on a prediction of a range of motion of the stylus.

20. The article of manufacture defined in claim 18 wherein the method further comprises generating a delta image corresponding to user input received by the touch screen using the information identifying the subset transmitters of a plurality of transmitters and raw image data received from the analog front end.

21. The article of manufacture defined in claim 18 wherein the method further comprises:
storing the information in a configuration register; and
accessing the configuration register to determine transmitters in the plurality of transmitters to drive for the scanning operation.

* * * * *